United States Patent
Hantzschmann et al.

(10) Patent No.: US 12,416,320 B2
(45) Date of Patent: Sep. 16, 2025

(54) FLUID MODULE

(71) Applicant: EATON INTELLIGENT POWER LIMITED, Dublin (IE)

(72) Inventors: Quirin Hantzschmann, Maisach (DE); William H. Newsome, Dexter, MI (US); Markus Gillmeister, Unterhaching (DE); Jochen Meidlein, Munich (DE); Herbert Heinzinger, Sulzemoos (DE)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 18/104,677

(22) Filed: Feb. 1, 2023

(65) Prior Publication Data
US 2023/0242278 A1    Aug. 3, 2023

Related U.S. Application Data

(60) Provisional application No. 63/305,382, filed on Feb. 1, 2022.

(51) Int. Cl.
*F15B 1/26* (2006.01)
*B64C 13/36* (2006.01)
(Continued)

(52) U.S. Cl.
CPC ............ *F15B 21/041* (2013.01); *B64C 13/36* (2013.01); *B64F 5/40* (2017.01); *B64F 1/36* (2013.01); *F15B 1/26* (2013.01)

(58) Field of Classification Search
CPC .................................. B64C 13/36; F15B 1/26
See application file for complete search history.

(56) References Cited

U.S. PATENT DOCUMENTS

| 4,690,621 A | 9/1987 | Swain |
| 5,705,065 A | 1/1998 | Sharpe |

(Continued)

FOREIGN PATENT DOCUMENTS

| CN | 212262541 | 1/2021 |
| EP | 3350125 | 4/2020 |

(Continued)

OTHER PUBLICATIONS

Translation of KR 2005 0011223 (Year: 2005).*

(Continued)

*Primary Examiner* — Jason K Niesz
(74) *Attorney, Agent, or Firm* — Merchant & Gould P.C.

(57) ABSTRACT

A fluid module configured to be connected to an aircraft, comprising a manifold configured to direct fluid flow from an inlet to an outlet, the outlet configured to be connected to a hydraulic system of the aircraft and the inlet configured to be connected to a ground source of fluid, the manifold comprising a filter port adapted to receive a filter port; the first inlet in fluid communication with the filter port; and the outlet in fluid communication with the filter port. A method of utilizing the fluid module to provide fluid from the ground fluid source to the filter unit; filtering the fluid via the filter unit; and providing the filtered fluid from the outlet to one or more components, a reservoir of the aircraft, or combinations thereof.

28 Claims, 9 Drawing Sheets

(51) Int. Cl.
*B64F 5/40* (2017.01)
*F15B 21/041* (2019.01)
*B64F 1/36* (2017.01)

(56) References Cited

U.S. PATENT DOCUMENTS

2020/0340504 A1* 10/2020 Chung ................. F15B 21/041
2022/0348313 A1* 11/2022 Kaufmann .............. B64C 13/40

FOREIGN PATENT DOCUMENTS

| | | |
|---|---|---|
| GB | 2232092 A | 5/1990 |
| KR | 20050011223 A | 1/2005 |

OTHER PUBLICATIONS

"Rücklauf-Saugfilter RKM. Die neue Generation", Apr. 1, 2010 (Apr. 1, 2010), pp. 1-10, XP055060984, 66280 Sulzbach (Saar), Germany Retrieved from the Internet: URL: www.hydac.com [retrieved on Apr. 24, 2013] *the whole document*.
European Extended Search Report for Application No. 23154526.0 mailed Jun. 1, 2023.
Hydrant coupler to mate hydrants, Eaton (eaton.com), 32 pages. 2011.
Eaton's Carter Aviation Refueling Equipment Range (aljac.com), 5 pages. 2016.
3x4 inch hydrant coupler with pressure control (eaton.com), 53 pages. 2014.
Underwing Refueling Nozzle, Maintenance & Repair Manual, Eaton (beckeraviation.com), 27 pages. 2013.

* cited by examiner

FLUID MODULE

CROSS-REFERENCE TO RELATED APPLICATIONS

This application claims the benefit of U.S. Provisional Patent Application No. 63/305,382, filed Feb. 1, 2022, entitled FLUID MODULE, the disclosure of which is incorporated herein by reference in its entirety.

TECHNICAL FIELD

The present disclosure generally relates to fluid modules, including fluid modules that may be utilized in connection with aircraft.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some fluid modules are large, heavy, and/or complicated to assemble. There is a desire for solutions/options that minimize or eliminate one or more challenges or shortcomings of fluid modules. The foregoing discussion is intended only to illustrate examples of the present field and is not a disavowal of scope.

SUMMARY

In embodiments, a fluid module may comprise a manifold including a filter port, a first inlet in fluid communication with the filter port, a second inlet in fluid communication with the filter port, and/or an outlet in fluid communication with the filter port; a first coupling connected to the first inlet; a second coupling connected to the second inlet; and/or a fluid interface connected to the outlet. A body of the manifold may be cylindrical. The fluid module may include a third coupling. The manifold may include a flange. The third coupling may be connected to the flange. The fluid module may include a filter connected to the filter port. The fluid module may include a second fluid interface (e.g., an aircraft return interface). The fluid interface and the second fluid interface may be disposed at a first side of the manifold. The first coupling, the second coupling, and/or the third coupling may be disposed at a second side of the manifold.

The foregoing and other potential aspects, features, details, utilities, and/or advantages of examples/embodiments of the present disclosure will be apparent from reading the following description, and from reviewing the accompanying drawings.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Reference will now be made in detail to embodiments of the present disclosure, examples of which are described herein and illustrated in the accompanying drawings. While the present disclosure will be described in conjunction with embodiments and/or examples, they do not limit the present disclosure to these embodiments and/or examples. On the contrary, the present disclosure covers alternatives, modifications, and equivalents.

Described herein is a fluid module configured to be attached to an aircraft to provide fluid from a ground source of fluid to an aircraft. Conventional solutions often include numerous bulky components for ground service of an aircraft. This disclosure contemplates a fluid module configured to combine all components necessary for ground service of the aircraft into a single module that is optimized for size and weight efficiency without compromising functionality.

Certain aspects of the present disclosure relate to a fluid module that in certain examples can be mounted to an aircraft to provide a readily accessible and compact interface between a hydraulic system of the aircraft and a ground located source of hydraulic fluid. In certain examples, the fluid module can include a manifold defining a filter port for mounting a replaceable filter used to filter hydraulic fluid directed through the manifold from the source of hydraulic fluid to the hydraulic system of the aircraft. The manifold can include one or more inlets (e.g., first and second inlets) for connecting the source of hydraulic fluid to the manifold. The manifold can define one or more fluid inlet paths for directing hydraulic fluid from the inlet or inlets to the filtration location defined by the filter port. The inlet fluid paths can be configured to direct fluid to a "dirty" side of a filter media of the filter at which contamination can be collected. One-way valves can be provided for allowing flow through the manifold to travel through the inlet passage or passages only in a direct toward the filtration location thereby preventing back-flow toward the source of hydraulic fluid. The manifold also defines an outlet connected in fluid communication with the filtration location by an outlet path defined by the manifold. The outlet path can be configured to receive filtered fluid that has passed from the inlet passage through the filter media of the filter. The fluid module can also include a connection device (e.g., an adapter) for allowing a fluid return line from the hydraulic system of the aircraft to be connected to the source of hydraulic fluid (e.g., to a reservoir of the source of hydraulic fluid). The connection device can include a one-way valve for preventing back-flow from the source of hydraulic fluid toward the fluid return line of the aircraft. In one example, the connection device is mounted to an exterior flange of the fluid module. The connection device can include a first fluid connection interface for connecting the fluid return line to the connection device and a second fluid connection interface for connecting the source of hydraulic fluid to the connection device. Example fluid connection interfaces can include couplers, fittings, threaded connections, ferrules, hose clamp locations, or other structures. In one example, the first fluid connection interface provides a more permanent connection (e.g., a threaded connection) than the second fluid connection interface. In one example, the second fluid connection interface includes a quick-disconnect coupling (e.g., a coupling that can be coupled/decoupled without threading). In certain examples, an outlet fluid connection interface is provided at the outlet and inlet fluid connection interfaces are provided at the inlet or inlets. As described above, example fluid connection interfaces include couplers, ferrules, fittings, threaded connections, hose clamp locations and the like. In one example, the outlet fluid connection interface is more permanent (e.g., a threaded connection) than the inlet fluid connection interfaces. In one example, the inlet connection interfaces include quick-disconnect couplings (e.g., a coupling that can be coupled/decoupled without threading). In one example, the first fluid connection interface of the connection device and the outlet fluid connection interface face in a first direction, while the second fluid connection interface of the connection device and the inlet fluid connection interfaces face in an opposite second direction. In certain examples, the fluid module is configured such that when the fluid module is mounted to the aircraft, the first direction faces inwardly toward the aircraft while the second direction faces outwardly from the aircraft. In one example, the outlet/outlet passage of the manifold include a one-way valve that prevents back-flow from the hydraulic system of the aircraft to the manifold. This can protect the manifold and its components from pressure surges during flight.

In embodiments, such as generally illustrated in FIGS. 1-5, a fluid module 20 may include a manifold 30 and/or a filter unit 32. A manifold 30 may include a fluid chamber 40, a first inlet 42, a second inlet 44, a filter port 46, and/or an outlet 50. The first inlet 42 and/or the second inlet 44 may be in fluid communication with the fluid chamber 40 and/or the filter port 46. For example, fluid provided to the first inlet 42 and/or the second inlet 44 may be provided to the fluid chamber 40. The fluid chamber 40 may be in fluid communication with the filter port 46. The filter port 46 may be configured for connection with the filter unit 32, such as to facilitate filtering of the fluid received via the first inlet 42 and/or the second inlet 44. The filter unit 32 and/or the filter port 46 may be in fluid communication with the outlet 50. For example, fluid that has been filtered by the filter unit 32 may be provided to the outlet 50. The filter unit 32 may include a filter element 34 (see, e.g., FIG. 6). The filter port 46 may, in some configurations include threads for engaging a filter bowl of the filter unit 32 and/or a shuttle valve to facilitate removal of the filter bowl (e.g., to limit/prevent leaks).

With embodiments, a manifold 30 may include one or more of a variety of shapes, sizes, configurations, and/or materials. For example, the manifold 30 may include a substantially cylindrical body 60 and/or a flange 62 that may extend from the body 60. The flange 62, at least in some configurations, may be substantially planar, and/or may extend axially from an axial end of the body 60. The flange 62 may, for example, be parallel to a plane that bisects the body 60 (e.g., into inner and outer sides). The flange 62 may be shorter, in an axial direction, than the body 60. For example and without limitation, the axial length of the flange 62 may be between about 25% and about 75% of the axial length of the body 60. In some instances, the axial length of the flange 62 may be about half of the axial length of the body 60. The width of the flange 62 may be about the same as or less than the diameter of the body 60, or larger than the diameter of the body 60. The manifold 30 may, for example and without limitation, comprise metal (e.g., stainless steel) and/or may be formed via machining and/or additive manufacturing. The manifold 30 may include a central axis C (see, e.g., FIG. 3) that may be aligned with and/or parallel to an axial direction of the fluid module 20.

With embodiments, a fluid module 20 may include one or more couplings, such as a first coupling 70, a second coupling 72, and/or a third coupling 74. The first coupling 70 may be connected to the first inlet 42. The second coupling 72 may be connected to the second inlet 44. The first coupling 70 may, for example, include a quick-disconnect (QD) coupling and/or may be configured for connection with a fluid source 80 that may be configured to provide pressurized fluid for an aircraft 100 (see, e.g., FIGS. 7 and 8). For example and without limitation, an aircraft 100 may include one or more actuators 102 that may utilize and/or be powered via pressurized fluid. When the aircraft 100 is on the ground, it may be desirable to operate the one or more actuators 102 without using the engines or other power sources 104 of the aircraft 100. The fluid source 80, which may include a ground cart, may be configured to provide such pressurized fluid instead of via aircraft fluid systems that may rely on the engines/power sources 104. For example, the fluid source 80 may include a pump and/or a pressurized tank. The second coupling 72 may, for example, include a fill valve, a QD coupling, and/or may be configured for connection with the fluid source 80, which may be configured to provide low pressure or unpressurized fluid to the aircraft 100. For example, if an aircraft fluid system/reservoir 108 has a low fluid level, the fluid source 80 may provide fluid to the aircraft 100 via the second coupling 72 to increase the fluid level. In some configurations, a fluid module 20 may not include a second inlet 44/a second coupling 72 and/or the first coupling 70 may be utilized to fill a reservoir 108. The third coupling 74 may be connected to the flange 62 and/or may include a QD coupling, among other configurations. The third coupling 74 may, for example, be configured for connection with a fluid source 80, such as to provide return fluid from the aircraft 100 to the fluid source 80.

In embodiments, a fluid module 20 may include one or more fluid interfaces, such as a first interface 90 and/or a second interface 92. An interface 90, 92 may include a coupling or other component/formation to facilitate fluid communication (e.g., a ferrule, fitting, etc.), such as with a fluid conduit 106 of an aircraft 100. The first interface 90 may be connected to the outlet 50 of the manifold 30 and may be configured to provide filtered fluid (e.g., pressurized or fill) from the manifold to one or more fluid conduits 106, reservoirs, and/or to one or more actuators 102 of the aircraft. The second interface 92 may be connected to the flange 62 and/or the third coupling 74, such as to receive return fluid from the aircraft 100 for providing/returning to the fluid source 80.

With embodiments, a fluid module 20 may include an indicator 120 that may be configured to provide an indication regarding the status of the filter unit 32 and/or the differential pressure across the filter unit 32, which may correspond to how full/clogged the filter unit 32 is. For example, the indicator 120 may be in fluid communication with the chamber 40/the first inlet 42/the second inlet 44 and the outlet 50, such to sense a differential pressure between the chamber 40/the first inlet 42/the second inlet 44 and the outlet 50 (e.g., the indicator 120 may include a pressure sensor/indicator). The differential pressure may increase as the filter unit 32 fills up with particles filtered out from the fluid. When the differential pressure reaches a threshold, the indicator may provide a visual indication (e.g., color change, movement, etc.), which may suggest that the filter element 34 should be cleaned or replaced.

Figure 1:
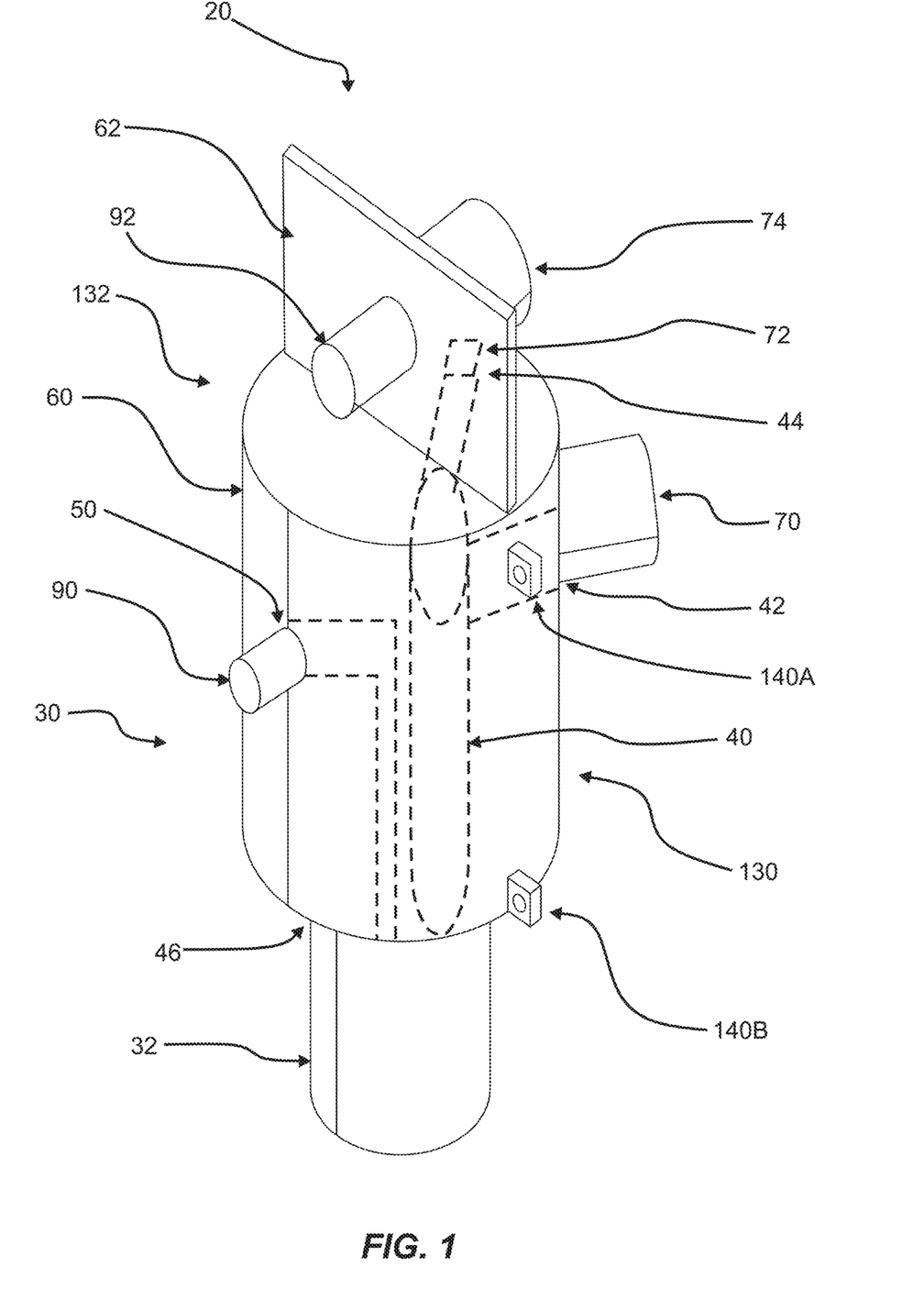
FIG. 1 is a perspective view generally illustrating an embodiment of a fluid module according to teachings of the present disclosure.
Figure 2:
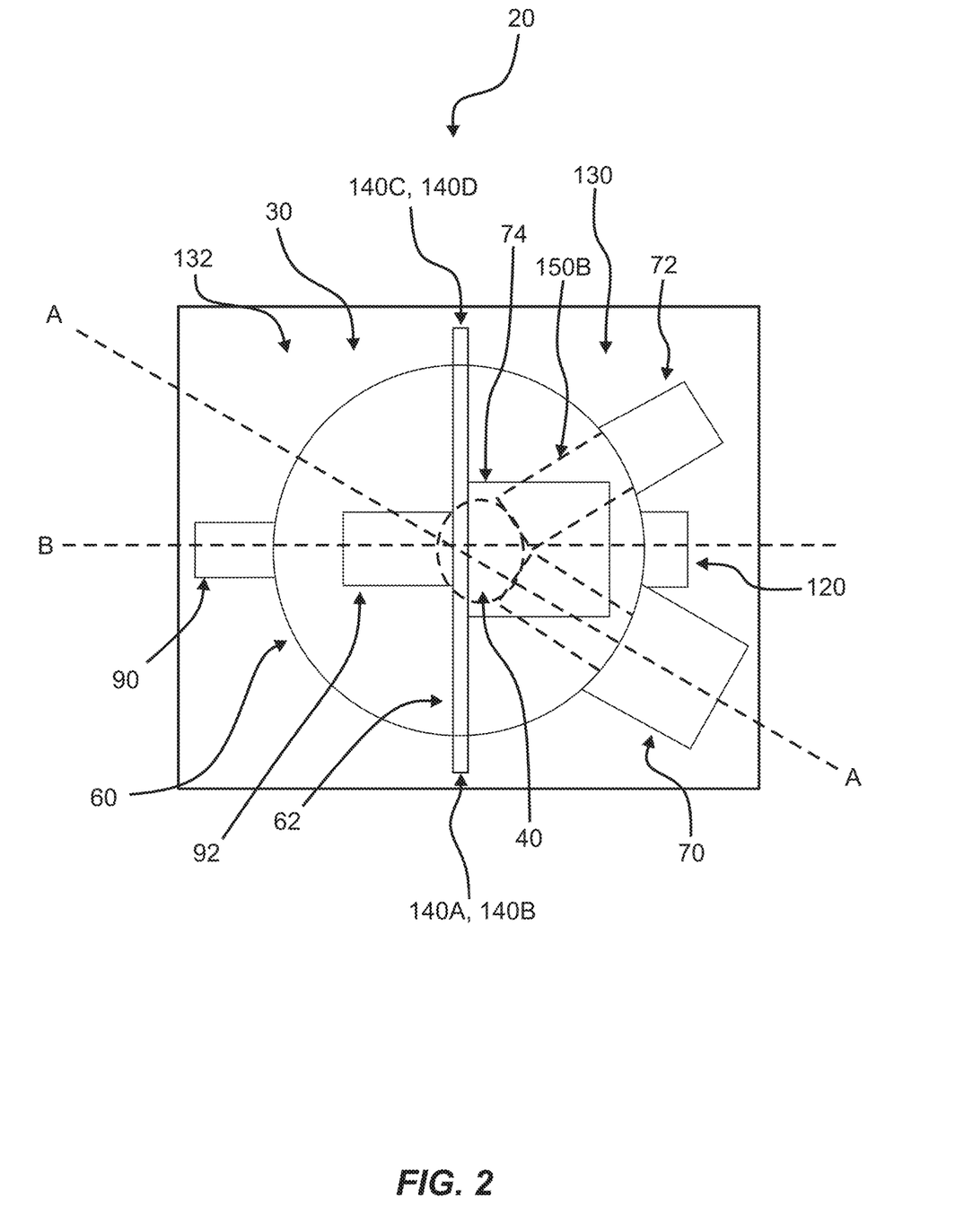
FIG. 2 is a top view generally illustrating an embodiment of a fluid module according to teachings of the present disclosure.
Figure 3:
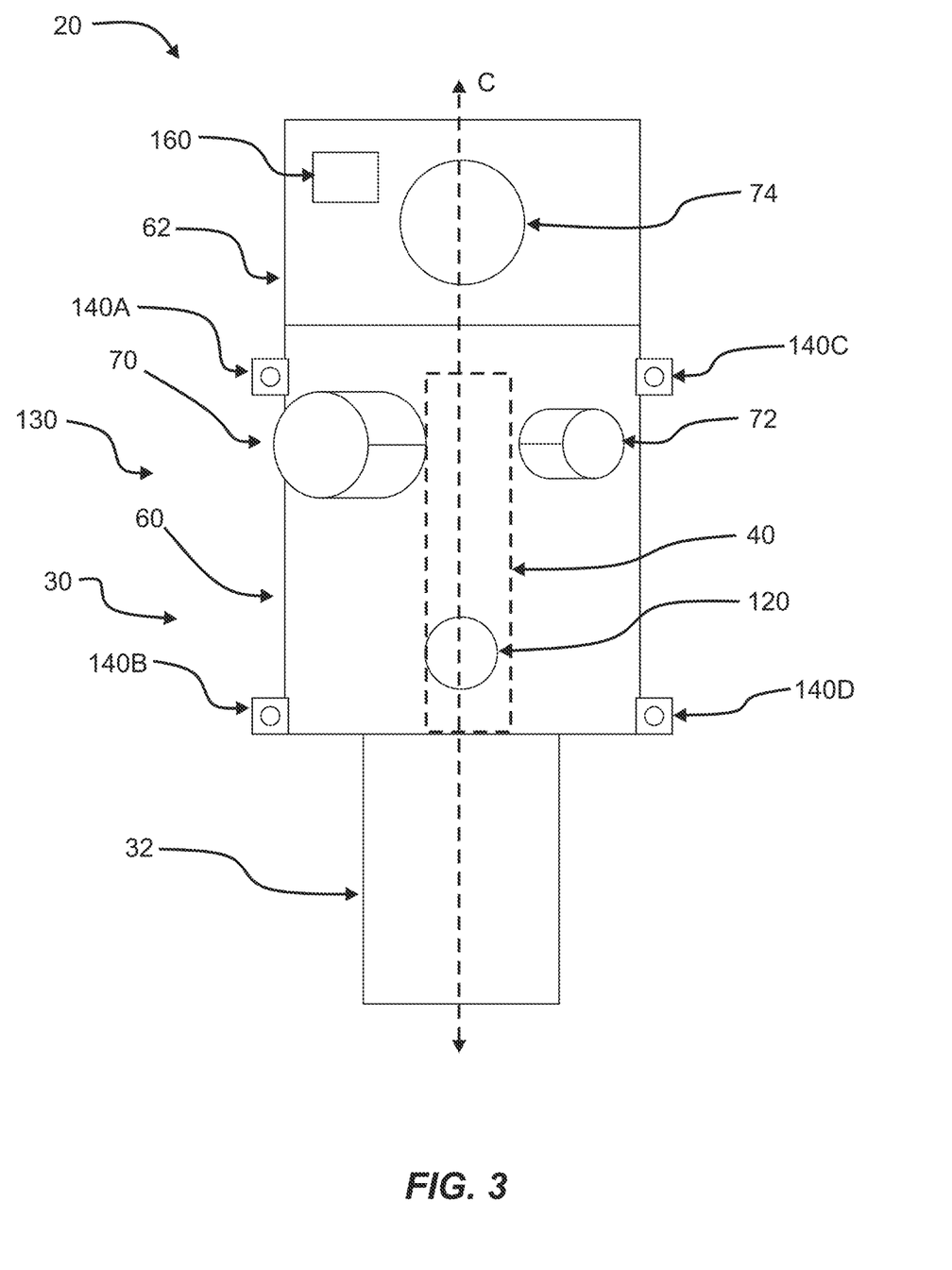
FIG. 3 is a front view generally illustrating an embodiment of a fluid module according to teachings of the present disclosure.
Figure 4:
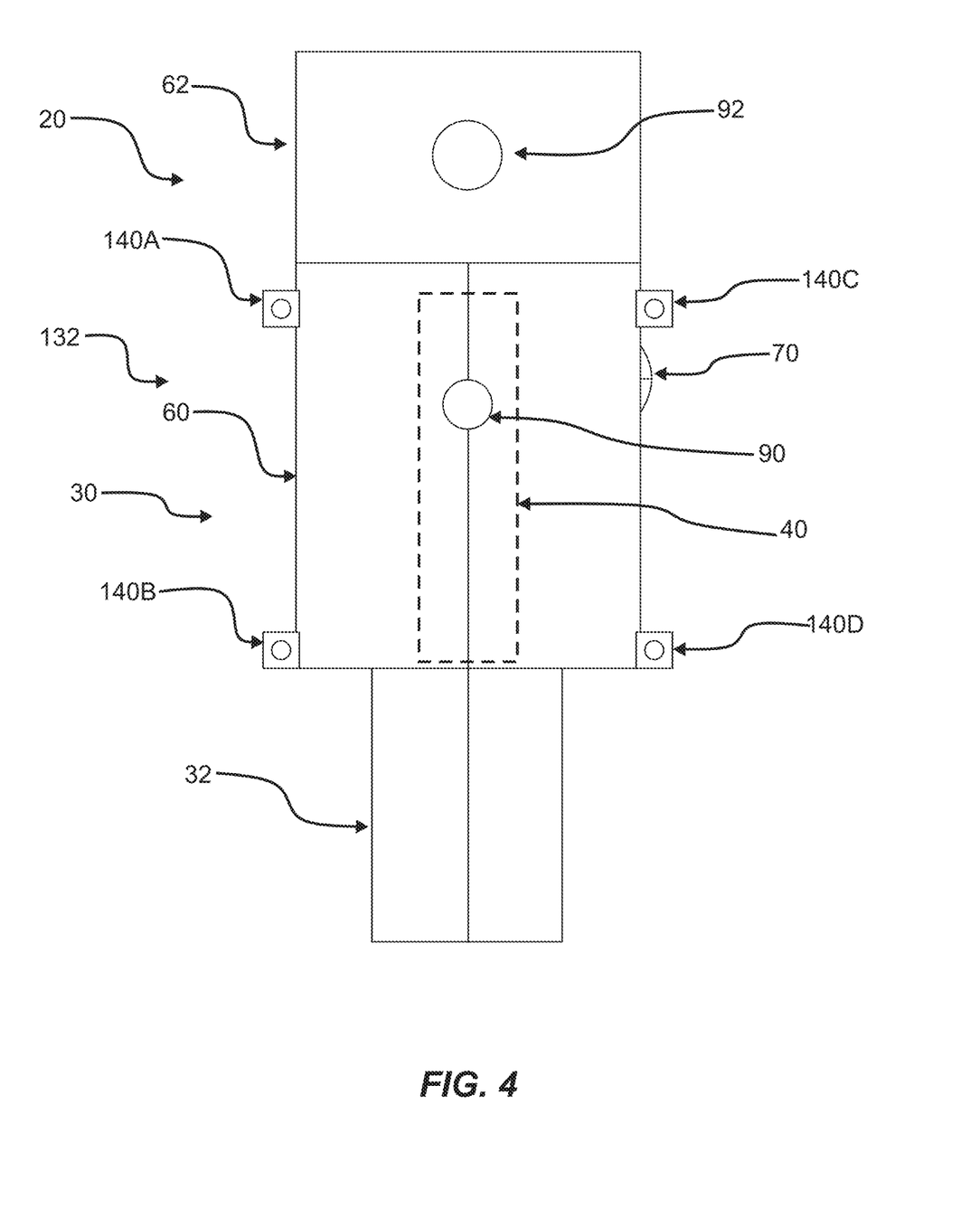
FIG. 4 is a rear view generally illustrating an embodiment of a fluid module according to teachings of the present disclosure.
Figure 5:
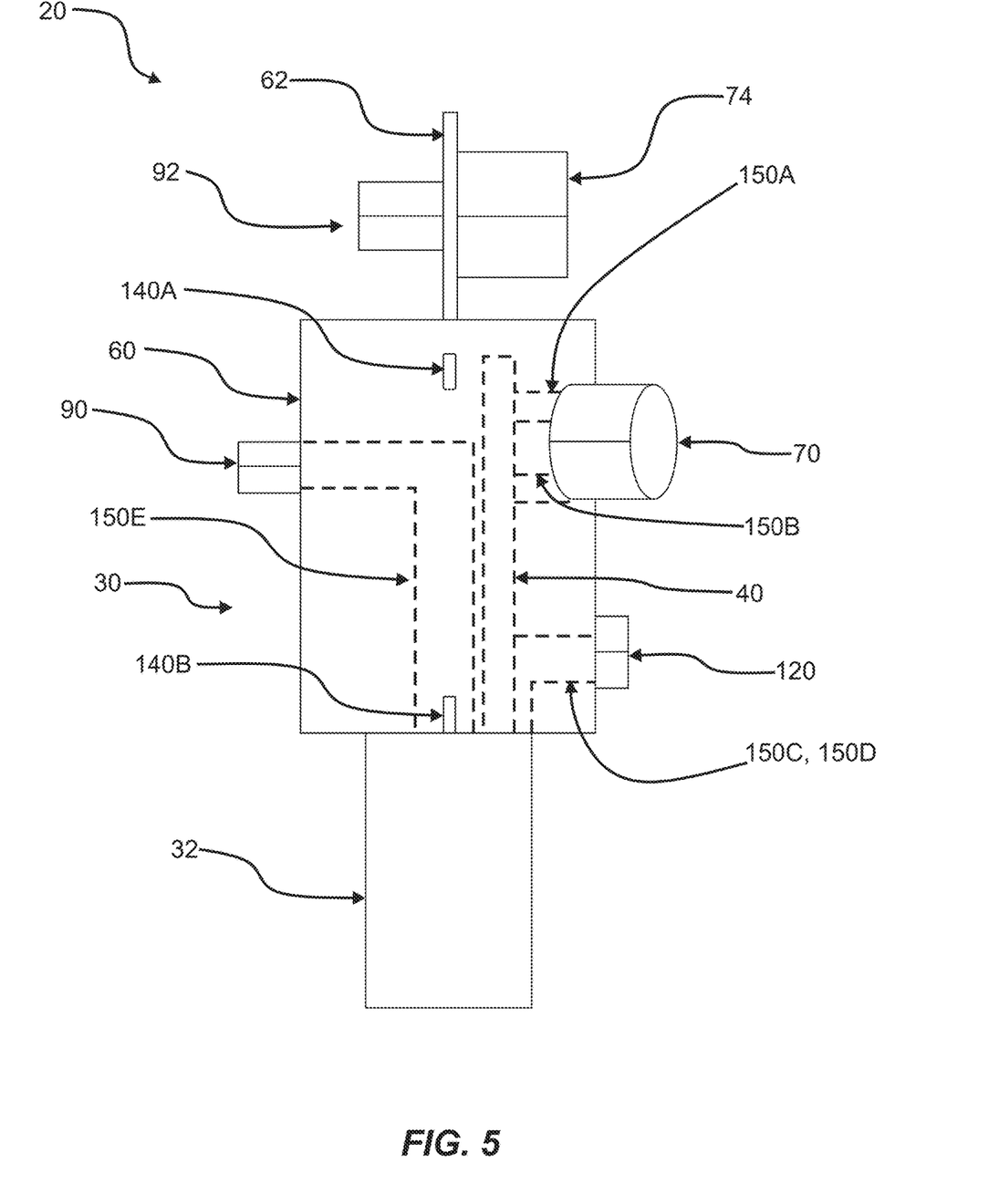
FIG. 5 is a side view generally illustrating an embodiment of a fluid module according to teachings of the present disclosure.

In embodiments, such as generally illustrated in FIG. 2, a manifold 30 may include a first side 130 and a second side 132. The first side 130 may be configured to face outward, such as for connection with the fluid source 80. The second side 132 may be configured to face inward, such as for connection with one or more actuators 102 and/or fluid conduits 106. In some configurations, the first coupling 70, the second coupling 72, the third coupling 74, and/or the indicator 120 may extend from the first side 130, and/or the first interface 90 and/or the second interface 92 may extend from the second side 132. For example and without limitation, the first coupling 70 and the second coupling 72 may extend from the body 60 of the manifold 30 at an angle relative to each other (e.g., an acute or right angle), the third coupling 74 and/or the indicator 120 may extend outward (e.g., perpendicular to the flange 62), and/or the first interface 90 and/or the second interface 92 may extend inward (e.g., perpendicular to the flange 62 and/or anti parallel to the third coupling 74). The third coupling 74, the first interface 90, the second interface 92, and/or the indicator 120 may be aligned in an axial direction such that their centerlines are aligned with a plane B extending in the axial direction and perpendicular to the flange 62. The third coupling 74 and the second interface 92 may extend in opposite directions from the flange 62. In some instances, the first coupling 70, the second coupling 72, and the third coupling 74 may extend in three different directions.

Embodiments of a fluid module 20 may be smaller, lighter, and/or less complex than other designs. For example and without limitation, one possible embodiment of a fluid module 20 may have a length (e.g., in the axial direction) of about 12-14 inches or less, a width (e.g., in a radial direction aligned with the flange 62) of about 4-6 inches or less, and/or a depth (e.g., in an inward/outward radial direction perpendicular to the flange 62) of about 6-8 inches or less. In an embodiment, a fluid module 20 may be less than 14 inches in a first direction, less than 6 inches in a second direction, and less than 8 inches in a third direction. Additionally or alternatively, the volume of an envelope (e.g., a rectangular prism encompassing the fluid module 20) of such an example embodiment may be about 700 cubic inches or less, about 500 cubic inches or less, or other volumes.

With embodiments, such as generally illustrated in FIGS. 1-5, a manifold 30 may include one or more mounting tabs, such as mounting tabs 140A, 140B, 140C, and 140D. The mounting tabs 140A-D may be configured for mounting a module 20 to a mounting surface, such as with an aircraft 100. The mounting tabs 140A-D may, for example, extend outward from the body 60, such as in a generally radial direction. The mounting tabs 140A-D may, for example and without limitation, include respective through holes, and/or may be generally rectangular, may include a first pair of mounting tabs 140A-B and a second pair of mounting tabs 140C-D that extend in opposite directions from the manifold 30. In some configurations, the mounting tabs 140A-D may be substantially aligned with a plane of and/or parallel with the flange 62.

Figure 6:
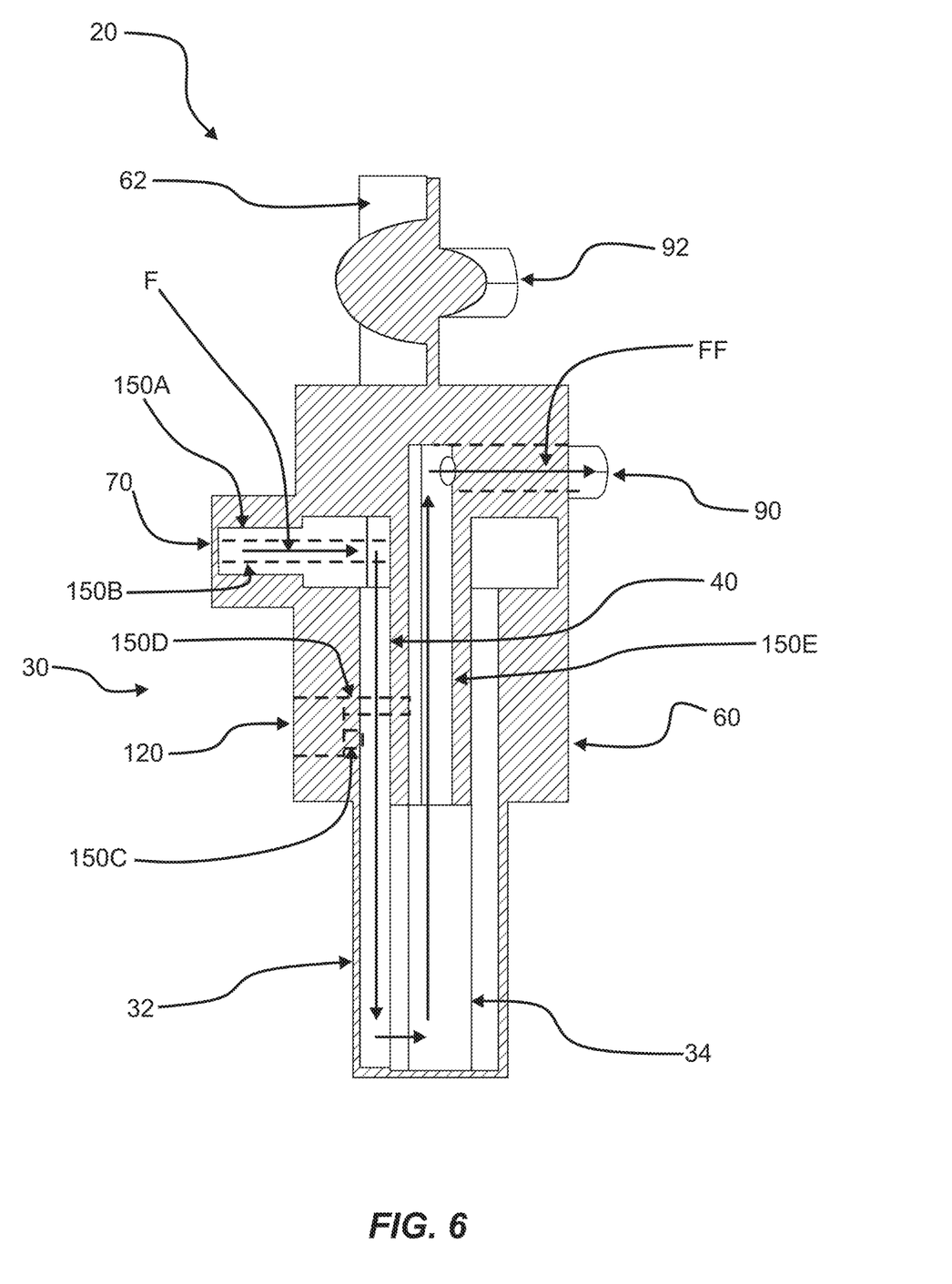
FIG. 6 is a cross-sectional view along line A-A of FIG. 2.

In embodiments, such as generally illustrated in FIG. 6, a manifold 30 may include one or more internal fluid passages, such as internal fluid passages 150A-E. A first fluid passage 150A may extend from the first inlet 42 to the filter port 46, such as to provide fluid F (e.g., pressurized fluid) from the first inlet 42 and/or the first coupling 70 to the filter unit 32. A second fluid passage 150B may extend from the second inlet 44 to the filter port 46, such as to provide fluid F (e.g., fill fluid) from the second inlet 44 and/or the second coupling 72 to the filter unit 32. A third fluid passage 150C may extend from the first fluid passage 150A, the second fluid passage 150B, and/or the filter unit 32 (e.g., at or about an input) to the indicator 120. A fourth fluid passage 150D may extend from a fifth fluid passage 150E and/or the filter unit 32 (e.g., at or about an output) to the indicator 120. For example and without limitation, the fluid passages 150C-D may be configured to allow the indicator 120 to sense a differential pressure across the filter unit 32. The fifth fluid passage 150E may extend from the filter unit 32 to the outlet 50 and/or the first interface 90, such as to provide filtered fluid FF from the filter unit 32 to the aircraft 100, one or more actuators 102, and/or one or more fluid conduits 106. A chamber 40 may be formed, at least in part, via one or more fluid passages, such as fluid passages 150A, 150B.

Figure 7:
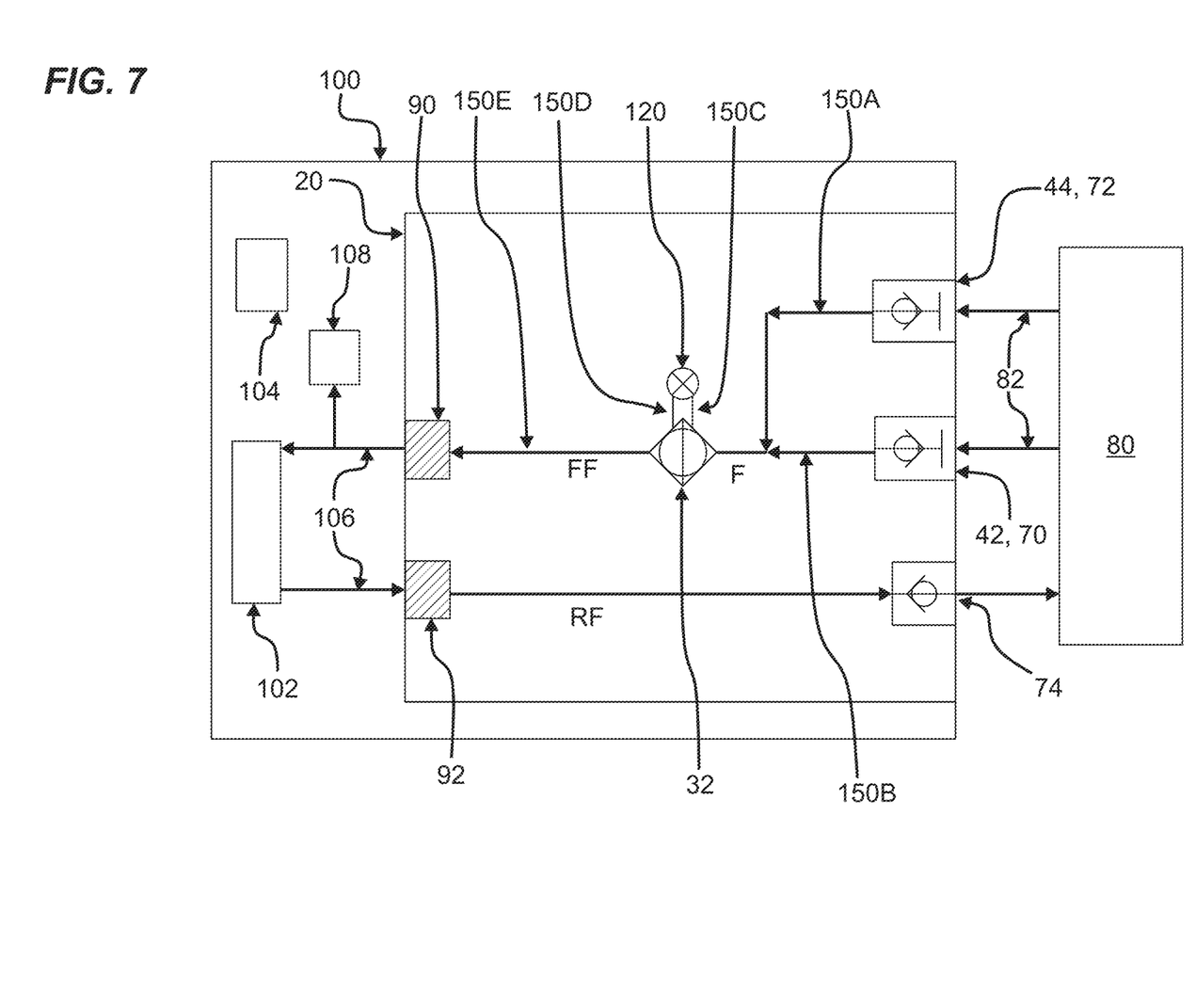
FIG. 7 is a schematic view generally illustrating portions of an embodiment of a fluid module according to teachings of the present disclosure.
Figure 8:
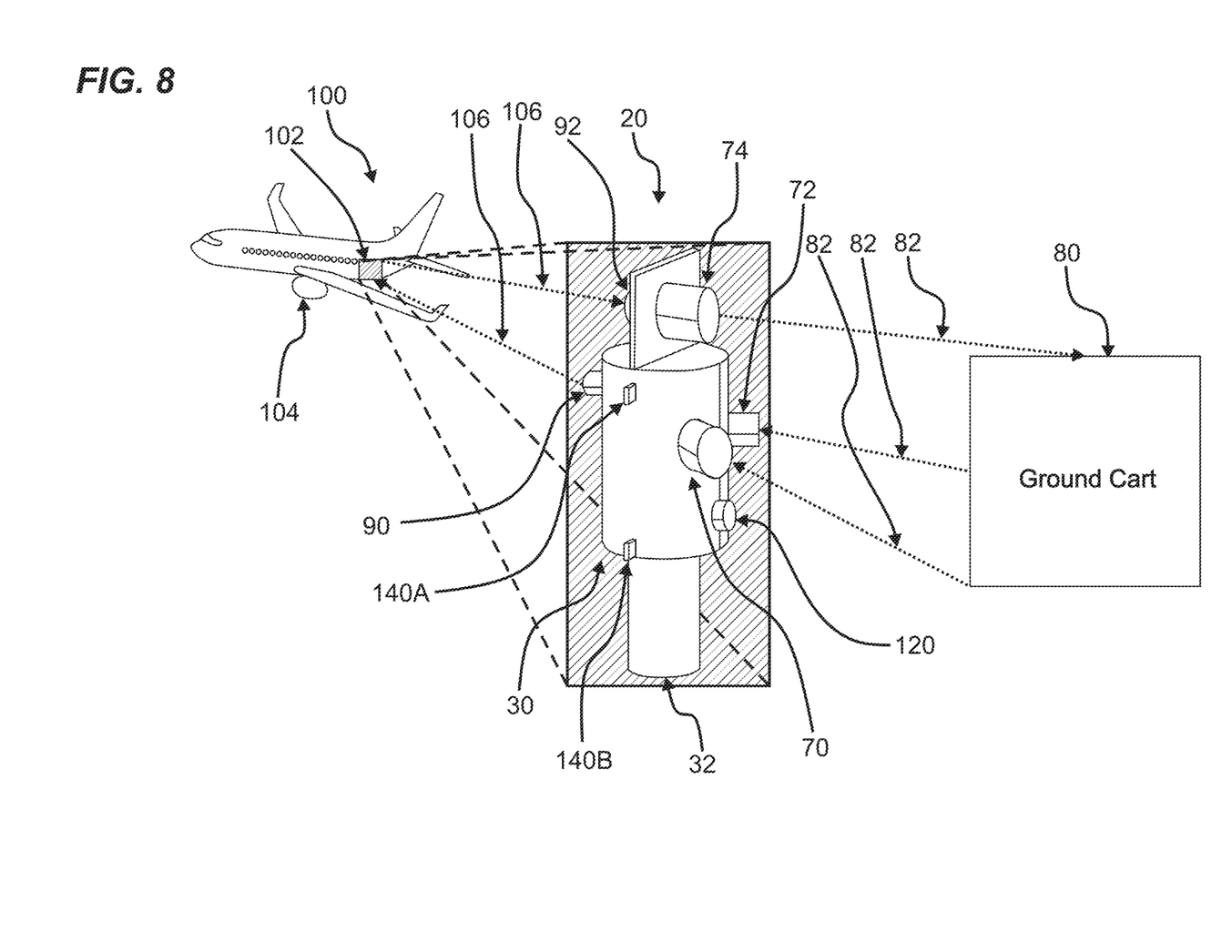
FIG. 8 is a representation generally illustrating embodiments of a fluid module, an aircraft, and a fluid source according to teachings of the present disclosure.

With embodiments, such as generally illustrated in FIGS. 7 and 8, a fluid source 80, which may include a ground cart (e.g., an airport hydraulic fluid cart), may be connected for fluid communication with a first inlet 42 of the module 20 via a first coupling 70, a second inlet 44 of the module 20 via a second coupling 72, and/or a second/return interface 92 via a third coupling 74. One or more of the first coupling 70, the second coupling 72, and/or the third coupling 74 may include a check valve and/or a QD connection. An input of the filter unit 32 may be connected for fluid communication with the first inlet 42 via the first passage 150A and/or to the second inlet 44 via the second passage 150B. An indicator 120 may be connected at or about the input of the filter unit 32 and at or about the output of the filter unit 32. The output of the filter unit 32 may be connected for fluid communication with a first interface 90 that may be connected to an aircraft 100 and/or a fluid conduit 106 and/or an actuator 102 thereof. A second interface 92 of the fluid module 20 may be connected for fluid communication with the aircraft 100 and/or a third coupling 74 of the fluid module 20. The fluid module 20 may be mounted on or in an aircraft 100 to facilitate fluid communication with a fluid source 80.

Referring again to FIG. 3, in embodiments, a fluid module may include one or more fluid components 160, such as one or more sampling valves, pressure relief switches, gauges, and/or displays, among others. The one or more fluid component 160 may, in some configurations, be connected and/or mounted to the flange 62.

Figure 9:
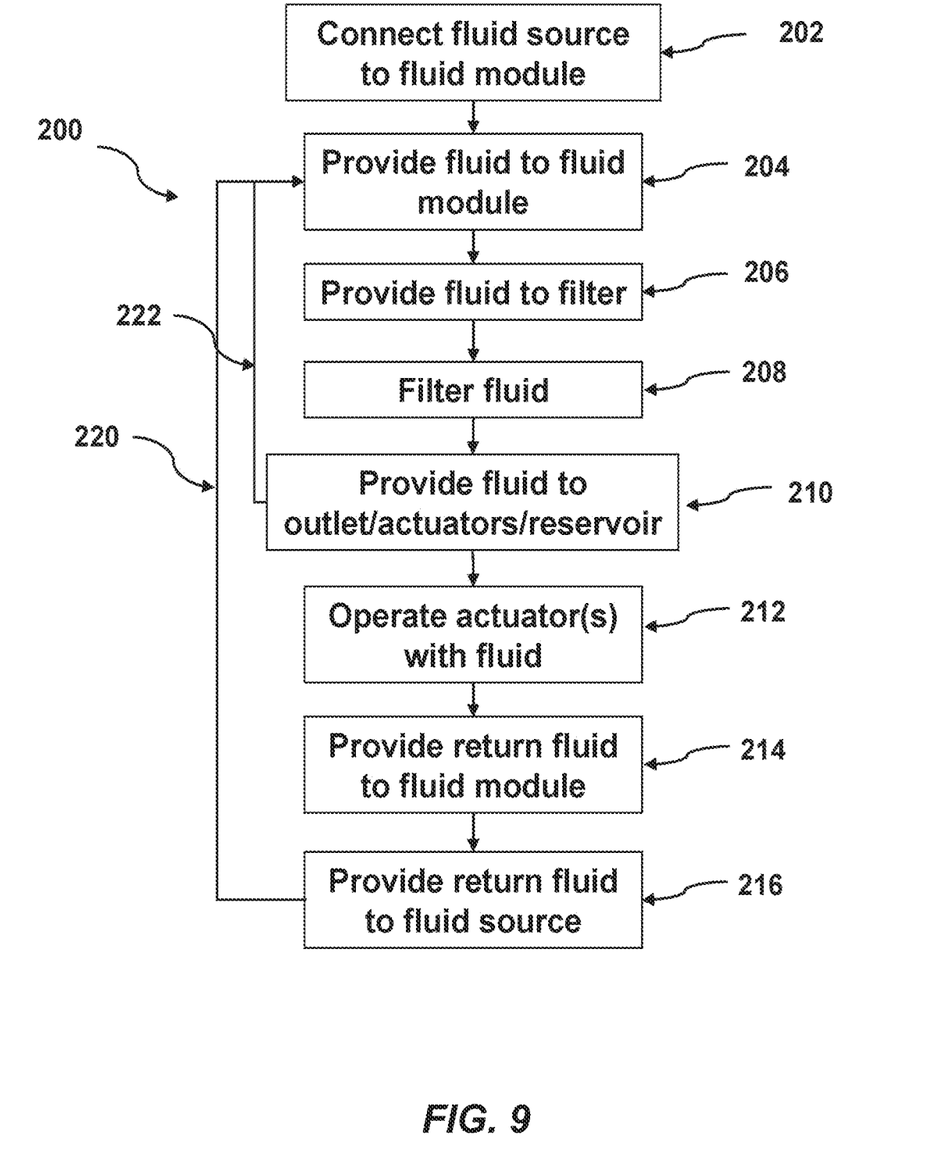
FIG. 9 is a flow diagram generally illustrating an embodiment of a method of utilizing a fluid module according to teachings of the present disclosure.

With embodiments, such as generally illustrated in FIG. 9, a method 200 of utilizing a fluid module 20, which may be mounted in/on an aircraft 100, may include connecting the fluid module 20 to a fluid source 80 (block 202). Connecting the fluid module 20 to the fluid source 80 may include connecting one or more fluid conduits 82 (e.g., hoses, tubes, etc.) to a first coupling 70, a second coupling 72, and/or a third coupling 74 of the fluid module 20. The method 200 may include providing fluid F from the fluid source 80 (e.g., a ground fluid source) to the module 20, such as to the first coupling 70 or the second coupling 72 (block 204). The provided fluid F may include pressurized fluid or fill fluid. The method 200 may include providing fluid F from the first coupling 70 or the second coupling 72 to a filter unit 32 (block 206), such as via one or more internal passages 150A-E and/or a chamber 40 of a manifold 30 of the fluid module 20. The method 200 may include filtering the fluid via the filter unit 32 (block 208) and/or providing the filtered fluid FF to an outlet 50 of the manifold 30, one or more actuators 102 of the aircraft 100 (e.g., for pressurized fluid), one or more fluid conduits 106 of the aircraft 100, and/or a reservoir 108 of the aircraft (e.g., for fill fluid) (block 210). The method 200 may include operating one or more actuators 102 (e.g., hydraulic motors, cylinders, pistons, etc.) with the filtered fluid FF (block 212), such as if the fluid source 80 provides pressurized fluid. The method 200 may include providing return fluid RF (e.g., from the one or more actuators 102) to the fluid module 20 (block 214) and/or from the fluid module 20 to the fluid source 80 (block 216). For example, return fluid RF may be provided from an actuator 102 to a second interface 92 of the fluid module 20, from the second interface 92 to a third coupling 74, and/or from the third coupling 74 to the fluid source 80. One or more blocks of the method 200 may be repeated (see, e.g., arrow 220), such as to continue to provide filtered and pressurized fluid to an aircraft 100 from a ground-based fluid source 80 to avoid utilizing the engines or other power sources 104 (e.g., batteries) of the aircraft 100. Additionally or alternatively, one or more blocks of the method 200 may be omitted. For example, if a fluid module 20 is being utilized to fill a reservoir 108 of an aircraft 100 and not to operate one or more actuators 102, the method 200 may not include blocks 212-216 and/or blocks 204-210 may be repeated (see, e.g., arrow 222). In some configurations, block 210 may include providing fluid to one or more actuators 102 and one or more reservoirs 108.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. Uses of "e.g." and "such as" in the specification are to be construed broadly and are used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A fluid module configured to be connected to an aircraft, comprising:
a manifold configured to direct fluid flow from a first inlet to an outlet, the outlet configured to be connected to a hydraulic system of the aircraft and the first inlet configured to be connected to a ground fluid source, the manifold comprising:
a filter port adapted to receive a filter unit;
the first inlet in fluid communication with the filter port;
the outlet in fluid communication with the filter port; and
a plurality of mounting tabs extending radially outward from the manifold, the mounting tabs configured to mount the fluid module to the aircraft.

2. The fluid module of claim 1, wherein the ground fluid source is a ground cart.

3. The fluid module of claim 1, wherein the fluid module has a weight of less than 12 pounds.

4. The fluid module of claim 1, wherein the fluid module is less than 14 inches in a first direction, less than 6 inches in a second direction, and less than 8 inches in a third direction.

5. The fluid module of claim 1, further comprising a first coupling at the first inlet and a fluid connection interface at the outlet.

6. The fluid module of claim 5, wherein the first inlet is in fluid communication with the filter port via a first internal fluid passage of the manifold;
a second inlet is in fluid communication with the filter port via a second internal fluid passage of the manifold; and
the outlet is in fluid communication with the filter port via a third internal fluid passage of the manifold.

7. The fluid module of claim 5, further comprising a second inlet connected to a second coupling, the first inlet configured to be connected to a first fluid source and the second inlet configured to be connected to a second fluid source, the first fluid source and the second fluid source having different pressures.

8. The fluid module of claim 7, wherein the first coupling and the second coupling are disposed at an acute angle relative to each other.

9. The fluid module of claim 7, further comprising a flange extending from a main body of the manifold, the flange comprising a third coupling configured to be connected to the ground fluid source to provide return fluid from the aircraft to the ground fluid source.

10. The fluid module of claim 9, wherein the flange is planar and extends axially from an axial end of the manifold.

11. The fluid module of claim 9, wherein the filter port is connected to the filter unit, wherein the filter unit is in fluid communication with at least one of the first inlet and the second inlet.

12. The fluid module of claim 11, further comprising an indicator configured to provide an indication regarding a status of the filter unit or a differential pressure across the filter unit.

13. The fluid module of claim 12, wherein the indicator is in fluid communication with the outlet and at least one of the first inlet and the second inlet.

14. A fluid module configured to be connected to an aircraft, comprising:
a manifold configured to direct fluid flow from a first inlet to an outlet, the outlet configured to be connected to a hydraulic system of the aircraft and the first inlet configured to be connected to a ground fluid source, wherein the ground fluid source is a ground cart, the manifold comprising:
a filter port adapted to receive a filter unit;
the first inlet in fluid communication with the filter port; and
the outlet in fluid communication with the filter port.

15. A fluid module configured to be connected to an aircraft, comprising:
a manifold configured to direct fluid flow from a first inlet to an outlet, the outlet configured to be connected to a hydraulic system of the aircraft and the first inlet configured to be connected to a ground fluid source, the manifold comprising:
a filter port adapted to receive a filter unit;
the first inlet in fluid communication with the filter port;
the outlet in fluid communication with the filter port;
a first coupling at the first inlet;
a fluid connection interface at the outlet;
a second inlet connected to a second coupling, the first inlet configured to be connected to a first fluid source and the second inlet configured to be connected to a second fluid source, the first fluid source and the second fluid source having different pressures; and
a flange extending from a main body of the manifold, the flange comprising a third coupling configured to be connected to the ground fluid source to provide return fluid from the aircraft to the ground fluid source.

16. The fluid module of claim 15, further comprising an indicator configured to provide an indication regarding a status of the filter unit or a differential pressure across the filter unit.

17. The fluid module of claim 16, wherein the indicator is in fluid communication with the outlet and at least one of the first inlet and the second inlet.

18. A fluid module configured to be connected to an aircraft, comprising:
a manifold including:
a filter port adapted for mounting a filter unit to the manifold;
a first inlet in fluid communication with the filter port;
a second inlet; and
an outlet in fluid communication with the filter port;
wherein the manifold has a cylindrical body, the first inlet and the outlet located on the cylindrical body of the manifold;
a first coupling connected to the first inlet;
a second coupling connected to the second inlet;
a third coupling;
wherein the manifold includes a flange and the third coupling is connected to the flange;
a fluid interface connected to the outlet; and
a second fluid interface;
wherein the fluid interface and the second fluid interface are disposed at a first side of the manifold; and
the first coupling, the second coupling, and the third coupling are disposed at a second side of the manifold, wherein the flange is planar and extends axially from an axial end of the manifold.

19. The fluid module of claim 18, wherein the first inlet and the outlet are located on a circumference of the cylindrical body of the manifold.

20. A method of utilizing the fluid module of claim 15 comprising:
    providing fluid from the ground fluid source to the first coupling or the second coupling;
    providing the fluid from the first coupling or the second coupling to the filter unit;
    filtering the fluid via the filter unit;
    providing the filtered fluid from the filter unit to the outlet; and
    providing the filtered fluid from the outlet to one or more components, a reservoir of the aircraft, or combinations thereof.

21. The method of claim 20, wherein the fluid provided from the first coupling is pressurized fluid and the fluid provided from the second coupling is low pressure or unpressurized fluid.

22. The method of claim 20, further comprising performing the method one or more times to continually provide fluid to the one or more components, the reservoir of the aircraft, or combinations thereof.

23. The method of claim 20, wherein the fluid includes hydraulic fluid, and the one or more components comprise one or more hydraulic actuators.

24. The method of claim 23, further comprising providing return fluid from the one or more hydraulic actuators or the aircraft reservoir to the ground fluid source via the third coupling of the fluid module.

25. The method of claim 23, wherein the one or more actuators comprise hydraulic motors, cylinders, pistons, or combinations thereof.

26. The fluid module of claim 18, wherein the manifold further includes a plurality of mounting tabs configured to mount to a mounting surface of the aircraft.

27. A fluid module configured to be connected to an aircraft, comprising:
    a manifold including:
        a filter port adapted for mounting a filter unit to the manifold;
        a first inlet in fluid communication with the filter port;
        a second inlet; and
        an outlet in fluid communication with the filter port;
    a first coupling connected to the first inlet;
    a second coupling connected to the second inlet;
        wherein the first coupling and the second coupling extend from a body of the manifold at an angle relative to each other;
    a third coupling;
        wherein the manifold includes a flange and the third coupling is connected to the flange;
    a fluid interface connected to the outlet; and
    a second fluid interface;
        wherein the fluid interface and the second fluid interface are disposed at a first side of the manifold; and
        the first coupling, the second coupling, and the third coupling are disposed at a second side of the manifold.

28. The fluid module of claim 27, wherein the flange is planar and extends axially from an axial end of the manifold.

* * * * *